May 30, 1950     L. ESPENSCHIED     2,509,913
ELECTRIC POWER SOURCE
Filed Dec. 14, 1944     2 Sheets-Sheet 1
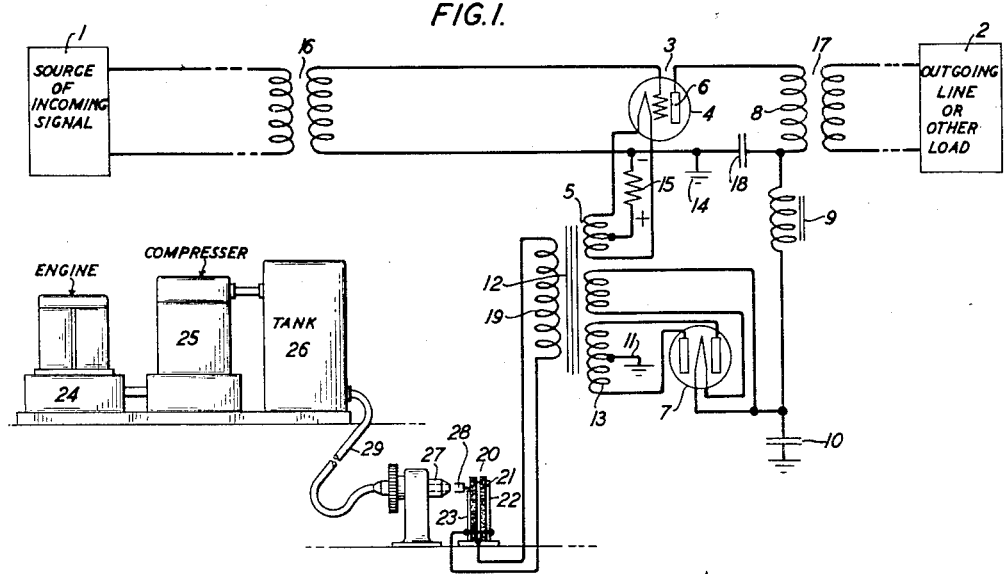
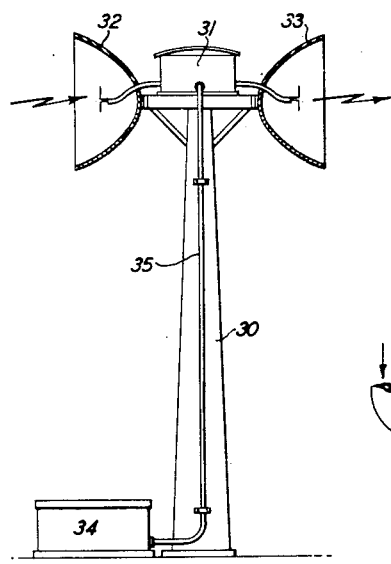
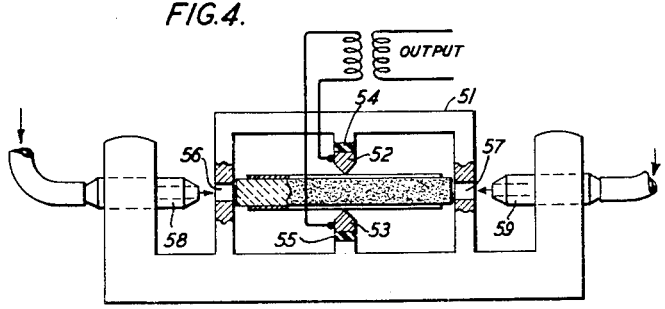
INVENTOR
L. ESPENSCHIED
BY
E. V. Griggs
ATTORNEY May 30, 1950 — L. ESPENSCHIED — 2,509,913
ELECTRIC POWER SOURCE
Filed Dec. 14, 1944 — 2 Sheets-Sheet 2

INVENTOR
L. ESPENSCHIED
BY
E. V. Griggs
ATTORNEY

Patented May 30, 1950

2,509,913

UNITED STATES PATENT OFFICE 2,509,913

ELECTRIC POWER SOURCE

Lloyd Espenschied, Kew Gardens, N. Y., assignor to Bell Telephone Laboratories, Incorporated, New York, N. Y., a corporation of New York Application December 14, 1944, Serial No. 568,171

23 Claims. (Cl. 290—4)

This invention relates to electric power sources and more particularly to a generating system free from rotating parts or contacts whereby reliable long continued operation may be had with a minimum of attention.

An object of the invention is to provide a primary source of electric power for an electronic discharge device, such as the vacuum tube, which shall be free from the complexities of electromagnetic machines.

Another object of the invention is to provide inexpensive rugged transportable devices for the production of electric power in relatively small magnitude over prolonged periods.

It is the further object of the invention to provide a primary source of electric power which is naturally adapted to generation at high frequencies, for the purpose of facilitating the application of the power to electronic devices.

The problem of supplying electric power to a radio or carrier wave repeating station at a location remote from a central station power system has, in the past, been met either by the transportation of charged storage batteries or primary electric cells to the repeater station or the installation of a dynamoelectric machine driven by a primary engine. In the case of the transportable storage battery its unwieldiness and the cost of transportation are such as to rule it out except for transient purposes. Moreover a primary battery has limited capacity and life. In general where batteries are used, for the purpose of insuring a reservoir of power, it is necessary to provide bulky and inefficient energy converting devices to transform the low voltage unidirectional power to the high voltages used in electronic devices. Such apparatus ordinarily involves transformation to alternating current and rectification of that current with the consequent necessity of large low frequency transformers and of relatively large filtering and smoothing elements to eliminate ripples and hum. The alternative of a primary engine driving a dynamoelectric machine without the addition of a battery still requires much of this apparatus and introduces an element of unreliability into the power source because such rotating machinery cannot be depended upon for long term unattended operation. Unattended operation is vital for important wide band electronic repeaters; because the whole repeating system is dependent upon the integrity of each repeater along the line, reliability of power supply is of the utmost importance.

The size and expense of existing forms of power supply for electronic repeaters arises in part also because the primary electrical elements which are used are of low impedance, whereas the electronic paths of the devices which they energize are inherently of high impedance and require for their efficient operation a correspondingly high impedance source of unidirectional current. Part of the difficulty of the present power supply practice arises from the fact that it is of historical origin. There has been taken for this purpose apparatus, which was evolved years ago for an entirely different state of the electrical art, involving low impedance devices and the production of large amounts of power. The application of the resulting batteries and rotating machines to the providing of the high voltage, small current, power in the relatively small amounts required for high frequency repeating stations naturally results in the difficulties cited.

The applicant's approach to the problem of power supply for electronic repeaters has been to consider the basic energy requirements of the repeaters in terms of impedance matching, the ease of filtering out the ripple, etc. It is sought to supply the energy by the simplest possible chain of apparatus, free from intervening stages of low voltage or low frequency power, since such apparatus is heavy and wasteful of materials and requires the intervention of transforming devices when the power is applied to vacuum tubes.

In accordance with the invention the electric power is generated in the first place as an alternating current of high frequency, preferably above the audible limit. Such high frequency permits of minimizing the size and cost of the transformers and power supply filters required in connection with the rectification and application of the power to the anodes of vacuum tubes. Such high frequency generation permits also the employment for power supply purposes of a basically new kind of generator, which avoids rotating parts with their necessity of lubrication, and avoids also such contacts as slip rings or brushes with their wear and necessity of attention.

The generator is of the oscillatory type. It is not a contact vibrator but rather an oscillator which generates electricity by virtue of the inductive action of mechanical vibrations as in magnetostriction oscillators and piezoelectric oscillators. While it cannot be said that such mechanical electrical oscillators do not involve moving parts since the vibrating element itself does move, it is true that the active element does not move as a whole but only as a deflection or wave action, so that there is no rubbing of one surface on another with its consequent wear and tear. In such mechanical electrical oscillators the displacement of the vibrating member is small, and the amount of energy which can be transferred in a single excursion is likewise small. Since, however, the excursions may be repeated at a rapid rate the energy carrying capacity of the generator is multiplied. This is one of the reasons for operating the generator at a high frequency, namely, that of enabling a relatively small and inexpensive device to handle energy of a level which is sufficient for certain power supply purposes. In general, the amount of power sought for the purposes of high frequency repeaters is of the order of a few watts, or a few tens of watts, and it is within the capabilities of such oscillatory devices to handle these amounts of power. Furthermore with the use of batteries of oscillators operating conjointly, higher powers can be attained. Therefore it will be appreciated that power supply systems of the type disclosed herein have more general application than is here illustrated. In what follows the mechanical electrical oscillator is of the piezoelectric type since this is at present preferred as it is capable of functioning as a transducer from mechanical to electrical power at high frequency with relatively high efficiency of the order of seventy-five per cent.

Thus far in the art of supersonics the piezoelectric crystal has been used either as a device for detecting weak received mechanical waves, as in submarine signaling and in the testing of materials at supersonic frequencies, or else has been used for the generation of the correspondingly more powerful waves used for transmitting supersonic mechanical waves. In the receiving role the crystal is a low energy device, generally requiring the use of an amplifier to supplement its role as a mechanical to electrical wave transducer.

Nowhere in the art of supersonics or of high frequencies generally is the piezoelectric crystal known to have been employed as a mechanical to electrical wave transducer for the purpose of providing material power, as for the energization of devices such as vacuum tubes. The piezoelectric crystal has always been so much regarded as a receiving device that the idea of employing it at high energy levels for power supply purposes has escaped attention. This is the more so since such primary generators of mechanical waves as have been available in the art, such as the Galton whistle type, have been looked upon as generators for testing and signaling purposes rather than as a source of power for the energizing of devices.

It now develops that the piezoelectric oscillator can be made so efficient as a converter of mechanical into electrical power, and such an oscillator can be driven so effectively by the primary mechanical oscillator of the whistle type that the combination forms a new and useful engine of electric power and this is the basis of the present invention.

In one aspect the invention is the combination of a piezoelectric oscillator functioning as a generator driven by a mechanical oscillator of the fluid flow or whistle type. There are various forms of mechanical oscillators but the whistle appears to be well adapted to the purpose. In accordance with the invention the resonant cavity of a Galton whistle, the dimensions of which cavity determine the frequency of oscillation, is made to drive a piezoelectric crystal and the natural frequency of the two elements, i. e., of the resonant cavity and of the crystal, is made identical so that the two devices work effectively together. In recent years the Galton whistle type of mechanical oscillator has been developed into the so-called Hartmann gas jet oscillator, a device which is especially adapted to the generation of supersonic frequencies and to the handling of several watts of power. In this device a jet of air at a pressure of a few atmospheres is directed at and carefully spaced from a little cylindrical cavity which constitutes the resonator. (For a description of this device see the book by Ludwig Bergmann entitled "Ultrasonics" published in New York by John Wiley & Sons Inc., 1938.) In accordance with the present invention this resonant cavity is so related mechanically to the piezoelectric crystal that the crystal is vibrated at the rate of the cavity oscillations. Then by providing that the natural period of vibration of the crystal be made the same as that of the cavity, and by suitable attention to the coupling of the two elements, an oscillator doublet is realized in which power may be transferred efficiently from the mechanical into the electrical form and at a frequency which is conveniently high for the purposes of the invention.

The primary power for the operation of the supersonic whistle may be derived from the pressure of the air or other gas which forms it, and the power for producing this pressure may in turn be derived from various sources such as an air compressor driven by a prime engine and provided with the usual supply tank for storing high pressure air.

In the drawing:

Fig. 1 shows the combination of a mechanical crystal oscillator generating the high frequency power supply current and supplying it through an alternating current rectifier to the vacuum tube of a wire line repeater;

Fig. 2 presents the structure of a microwave radio repeater located at a point remote from power supply networks;

Fig. 3 shows partly in section another mode of driving the crystal, the oscillation of the crystal being longitudinal and the drive symmetrical from the two ends with the resonant cavity recessed into the crystal itself;

Fig. 4 shows, partly in section, for the case of a longitudinally and symmetrically driven crystal, another way of forming the resonant cavities, i. e., outside of the crystal itself but with the crystal face forming the bottom of the resonant chamber;

Figure 5:
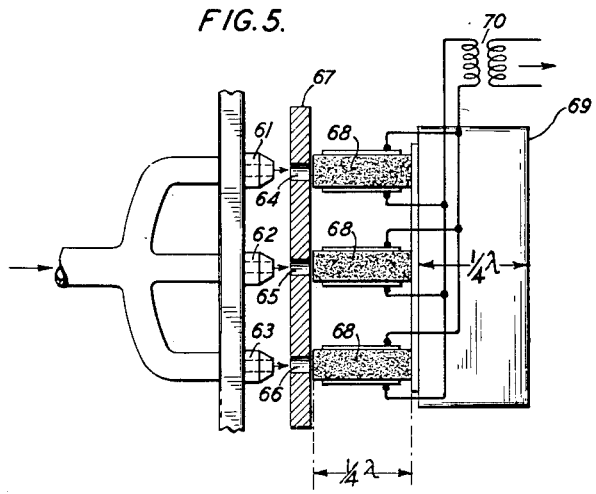
Figure 6:
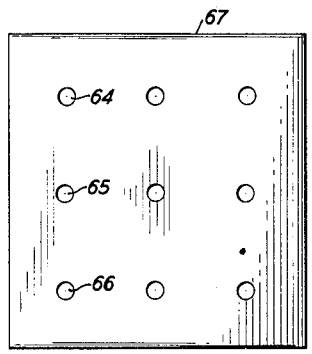
Figure 7:
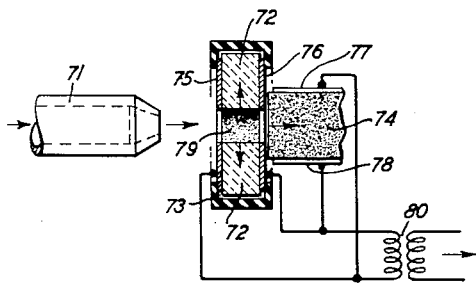
Figure 8:
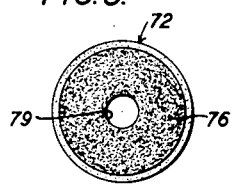
Figure 9:
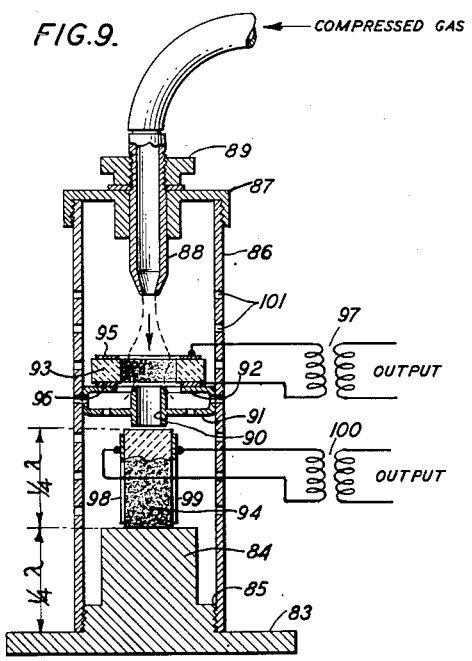

In Fig. 5 is shown, partly in section, a plurality of such jet crystal combinations all operating in synchronism to produce correspondingly greater power;

Fig. 6 shows an end view of the apertured sheet of Fig. 5 which constitutes the resonant cavities;

Fig. 7 shows, partly in section, a system which permits more closely relating the elements of the mechanical and electrical oscillators in which the resonant cavity is formed by the central opening of a toroidal crystal the mechanical oscillations of which take place along two oppositely directed radii and the cavity is closed at the back end by the reflecting surface of a second crystal which is driven longitudinally, the two crystals feeding into a common output;

Fig. 8 is an end view, partly in section, of the toroidal resonator of Fig. 7; and Fig. 9 shows another embodiment of the invention in which a separate Helmholtz resonator is positioned intermediate the toroidal and the longitudinal piezoelectric resonators.

Referring to Fig. 1, a source 1 of incoming signal current which may be an incoming section of a long carrier wave line is shown connected to an outgoing line section 2 by an intermediate repeater 3. Although the repeater will in general involve more tubes and a considerably more complex circuit than that disclosed, it is represented in this application as a triode 4 having its cathode supplied with heating current by the secondary winding 5 of a transformer 12. Space current is supplied to the anode 6 of the repeater by a full wave thermionic rectifier 7, the space current circuit of which is connected in series with that of the repeater 4 over a path which comprises the transformer winding 8, smoothing-out choke coil 9 (with which smoothing-out condenser 10 is associated in a derivatory connection to the presently considered series circuit), cathode to anode of rectifier 7, windings 13, ground 11, ground connection 14 and the cathode of repeater 4. Heating current for the cathode of the rectifier 7 is supplied by another secondary winding of transformer 12. The cathode of the repeater 4 is placed at a voltage which is positive with respect to the grid, meaning that the grid is negative with respect to it, by the inclusion of the resistance 15 in the center tap connection of transformer winding 5. The connections of the repeater tube 4 to the incoming and outgoing lines 1 and 2 are made through the usual transformers 16 and 17 as shown. The element 18 is a stopping condenser which excludes the direct current supply power and passes the alternating current amplified signaling currents.

The windings of the power supply transformer 12 may be on a single core or may be on separate cores, constituting a plurality of individual transformers, the primaries of which are connected in series in the power supply circuit 19. This circuit is energized by the piezoelectric element 20. This may consist of any of the known piezoelectric crystals but the drawing shows a bimorph of Rochelle salt crystal or potassium dihydrogen phosphate crystal supported at one end and free to deflect at the other. This piezoelectric element 20 is of such design as to have a natural frequency of vibration in the supersonic range, for example, of the order of 20 to 100 kilocycles. Accordingly, if the crystal be mechanically excited at its natural period it will undergo vigorous vibrations and develop between its conducting armatures 21, 22 and 23 electric charges which will flow through the primary winding of the transformer as a high frequency current. This energy will be at a relatively high voltage and low current, because of the natural high internal impedance of the crystal and therefore the transformation ratio of the transformer winding which supplies the anode current to rectifier 7 need not be high. In fact for some purposes this transformer may be omitted since the piezoelectric electromotive force developed by the crystal may range on an open circuit from several hundred up to a few thousand volts. And in any event it can be made small and compact because the frequency of the supply is high. The transformer elements themselves may be resonant, by their inherent magnetic leakage, to the frequency of the supply as a means of adjusting impedances and promoting efficiency of transfer in a manner well known to the high frequency art.

The piezoelectric element 20 may be excited mechanically at its natural resonant frequency in any desired manner. One convenient method of accomplishing this is by means of a high frequency air jet whistle having a nozzle 27. This whistle may be of the type disclosed by Hartmann, volume XI, No. 22, 7 series, April 1931, Philosophical Magazine, pages 926–948 inclusive. Such a whistle is capable of generating frequencies of the order of 100 kilocycles and of handling air input power of the order of 50 watts at an efficiency of the order of 10 to 20 per cent. This efficiency is not too low for the generation of modest amounts of power and the attainment of higher efficiencies may be anticipated upon further development.

This so-called Hartmann mechanical generator is characterized by an air jet under a pressure of a few atmospheres such that the air is discharged from the nozzle at a velocity greater than that of sound. Along such a jet there are equidistant points at which there is a condition of instability attended by alternately rising and falling pressure. If a cavity resonator 28, somewhat like a Helmholtz resonator, be placed in the air stream with its opening facing the jet orifice of nozzle 27 and positioned at one of the regions of instability, the resonator will first take in air at a certain pressure, then discharge the air and then again charge to the same pressure as before and discharge cyclically. Air vibrations produced in the resonator will be approximately of the natural period of the resonator. This natural period is determined principally by the cylindrical length of the cavity and secondarily by its diameter in accordance with formulae which have been published as in the book by Ludwig Bergmann previously cited, and also in the Hartmann article. In general the depth and diameter of the cavity are preferably made of comparable dimensions and the order of magnitude for this dimension, in the case of this Hartmann type of generator, is a little less than a millimeter for a frequency of 100 kilocycles, and up to a little less than 10 millimeters for a frequency of 10 kilocycles. Thus such cavities are small and the device may be made small and compact.

In the drawing the cavity resonator 28 is shown diagrammatically. It will be understood that in actual practice it comprises a hollow cylinder with its axis coincident with that of the nozzle 27 and with its open end opposite thereto. As shown it is mounted directly on the piezoelectric element 20 as by being cemented thereon. It may however be related thereto through a small connecting rod, and by making this rod a half wavelength long or a multiple thereof the rod may be supported at an intermediate nodal point.

This mechanical generator may be driven by compressed air by means of the assembly of apparatus shown in Fig. 1. Here 24 is a prime source of mechanical power, such as an internal combustion engine, 25 is an air compressor which is driven thereby and 26 is a tank which stores the compressed air from which the air is supplied to the whistle. Any other means for supplying compressed gas may be connected to the pipe 29 in lieu of the apparatus 24, 25 and 26 of Fig. 1.

Although there is illustrated in Fig. 1 a gas actuated mechanical oscillator, it will be appreciated that other oscillators operating on the principle of the instability of fluid flow under pressure are possible and come within the scope of the invention. The use of air, as distinct from a liquid, is attractive for the present purpose because of the high frequency which is attainable from it and the resulting small size and economy of the oscillator and its coupling to the piezoelectric crystal. It will be appreciated also that for the purposes of generating power of the order of only up to 100 watts [and in most instances considerably less power will suffice] the apparatus required to set up and maintain the gas pressure can be made small, economical, rugged and reliable. It will be appreciated also that on the electrical side of this system there is an entire absence of low frequency apparatus. The transformer 12, choke coil 9 and condenser 10 can be made small and cheap because of the high frequency which is generated. Preferably, the frequency of the air jet whistle and of the piezoelectric device 20 should fall outside the frequency band of currents transmitted from source 1 to source 2 so as to avoid any interference or cross-talk effects in the event that small amounts of high frequency power should be impressed upon the repeater 3.

Fig. 2 shows a structure of a microwave radio repeater station in which a pole or tower 30 supports an elevated repeater equipment 31 at its upper extremity. A collector 32 of weak incoming radio energy, which may be a suitably designed horn or a parabola reflecting energy into dipole antennas as indicated, is connected to the repeater and supplies the incoming signaling energy thereto. A directional radio emitter 33 which may be of a type similar to collector 32 is connected to the output of the radio repeating equipment to retransmit the amplified signal energy. The equipment in the structure 31 may correspond to the repeater 3 of Fig. 1, operating at a very high frequency. The power supply equipment may be located (1) entirely at the base of the tower as at 34 or (2) divided, the high frequency mechanical electrical generator being located on top of the tower in close proximity to the vacuum tube repeater elements, and the supply of high pressure gas provided from the apparatus located at the bottom of the tower, or (3) the entire equipment placed on top of the tower except, perhaps, the fuel tank.

In the first case the conduit 35 leading down the tower 30 would contain the electrical circuits which convey the high frequency power within a shield to the repeater atop the tower. In the second case the conduit 35 takes the form of a simple pipe which conducts the compressed gas from the seat of generation at the bottom of the pole to the little high frequency mechanical electrical generator at the top. In this latter case all the electrical wiring will be confined to a well shielded secure encasement at the top of the tower.

It will be appreciated that such power supply apparatus is likely to find use also on airplanes where space and weight are at a premium.

Fig. 3 shows a modification of the combination of the piezoelectrical crystal and the mechanical driving oscillator of Fig. 1. The two elements are more intimately related by virtue of the fact that the resonant cavity is formed as a recess in the crystal itself. Here again the crystal may be of any of several types and the location of the resonating recess in the crystal will, of course, be determined by the particular kind of crystal employed and the mode of its natural oscillation. In the present instance the crystal 40 is illustrated as being of the quartz type. It is intended to be cut so as to oscillate longitudinally as, e. g., an X-cut crystal. As illustrated, it would be about 5 centimeters long, which would correspond to a longitudinal half wave-length oscillation of about 50 kilocycles. It is mounted at the middle nodal point between the firmly gripping knife edges 42 and 43. At each of its two ends there is drilled in the crystal a cylindrical cavity 44 and 45 of a size such that the natural acoustic resonating frequency of each cavity will correspond to the natural frequency of the crystal. If the crystal cross section is large compared to this cavity the fundamental mode of longitudinal vibration will not be much affected by the drilling and will correspond approximately to the over-all length. But if the cavity cross section is a large proportion of the crystal cross section, then the fundamental period of longitudinal vibration will correspond more nearly to the length of the crystal as between the bottoms of the two cavities. The two cavities are excited into mechanical oscillation simultaneously by the air jets playing upon them from the two nozzles 46 and 47, air being fed to these nozzles from a common source of air under pressure. Care having been taken to make the cavities closely to the same dimensions, the crystal will then be driven simultaneously from the two ends in a compression-expansion mode along its length. The appropriate two faces of the crystal having been coated with conducting electrodes 48 and 49, the resulting piezoelectric charge is taken off these electrodes through the knife edge mounts 42 and 43, and the circuit is completed through a transformer 50 to constitute the electrical output of the device as indicated.

Fig. 4 shows a somewhat similar arrangement in which the cavities are positioned at the two ends of the crystal as in Fig. 3, but are provided not within the crystal itself, but in members which are immediately outside thereof. Surrounding the crystal and forming part of a general metal frame is a yoke 51 which together with the base of the frame supports the knife edge grippers 52 and 53. These are insulated from the supporting yoke and frame, as indicated at 54 and 55, for the purpose of preventing the frame from short-circuiting the crystal connections. The length of the frame longitudinally of the crystal is made such that the crystal will mount within the frame with its two ends just escaping contact with the vertical supports. In these vertical supports and in line with the crystal major axis are drilled two cylindrical holes 56 and 57. Each of these holes together with the end face of the crystal immediately behind it, which functions as an acoustic reflecting face, constitutes the resonant cavity. Each of these cavities is excited into its natural oscillation by jets of air from the axially aligned nozzles 58 and 59. For each of these cavities the end face of the crystal acts as the reflecting wall to terminate the resonant chamber and thereby the oscillations are built up. The frequency of oscillation is determined as in the system of Figs. 1 and 3 principally by the length of the cavity, taking into account also the small distance to the end face of the crystal and in a secondary way by the diameter dimension as previously explained. These dimensions are made such that the resulting mechanical oscillation coincides in frequency with the natural period of the crystal. Accordingly, the mechanical oscillations set up in each of the two cavities are transmitted inwardly to the crystal which then oscillates in a compression-expansion manner along its length. The resulting piezoelectric output is taken off in the manner previously described. The ability to form a cavity resonator in this manner, terminating it by a separate end surface which serves also to take off the vibrating energy, has been the subject of a scientific investigation the results of which are described by Ehret and Hanemann in the Zeitschrift für tech. Phys., No. 10, volume 23, 1942, pages 245–266. This article was abstracted in the British periodical "Wireless Engineer" for May 1943, page 255, Abstract No. 1453.

A plurality of such combinations of mechanical and electrical oscillators may be employed conjointly to enhance the total power obtainable. That is, a plurality of these combinations may be grouped together into a battery of jets, resonant cavities and crystals. Such a combination is illustrated in Fig. 5. Here the nozzles which supply the air jets are indicated as 61, 62, 63. The cavities are shown as 64, 65 and 66. These cavities may be formed as holes drilled through a sheet of material 67. Since this sheet has depth in a direction perpendicular to the paper, it is apparent that the array of elements can be in two dimensions instead of the single dimension indicated. In this case the plate of material 67, as shown in Fig. 6, is provided with a two-dimension array of holes and as will be understood readily without illustration is faced on one side by a two-dimension array of nozzles and on the other side by a corresponding two-dimension array of crystals for backing up the holes and taking off the oscillator power. Thus with an array of holes three deep, the arrangement of Fig. 5 would comprise 9 oscillator units. Immediately behind each cavity is the face of its corresponding crystal. These crystals 68 are shown in this instance to be one-quarter wavelength long mounted on a hard backing such as an iron block 69 serving as a backing barrier of the mounting block. By making the thickness of this backing barrier one-quarter wavelength the reflected mechanical wave is in opposition to the incident wave and flow of energy into this mounting block 69 is precluded. All the crystals vibrate at substantially the same frequency. Such intercoupling as exists between them holds them accurately in synchronism and the battery of crystals therefore gives a common output of a single frequency. The resulting electrical power is taken off through the transformer 70 as indicated.

A still more intimate relation between the resonant cavity and the responding piezoelectric crystal is shown in Fig. 7. Here 71 is the nozzle which supplies the air jet and 72 is a toroidal or doughnut type of quartz crystal shown in cross section. Fig. 8 shows an end view of the toroid. This toroid is held in a cylindrical guide 73 with its axis in line with the jet so that the hole which characterizes it now becomes the supersonic resonant cavity. To close the end of this cavity with respect to the air jet there is mounted close up against the toroid on the far side from the jet the face of a longitudinally vibrated crystal 74 similar to one of the crystals 68. Only a portion of one crystal 74 is shown; the crystal 74 may be dimensioned and mounted in the same manner as one of the longitudinal crystals 68 together with other similar crystals constituting a battery like that of Figs. 5 and 6. The toroidal crystal 72 carries on its two parallel faces the annular conducting electrodes 75 and 76. The reflecting crystal 74 carries corresponding electrodes 77 and 78. The toroidal crystal may be cut from the mother crystal in such a manner that its major mode of oscillation is, in general, radial, i. e., whereby as it vibrates it tends to grow larger and shrink smaller in a generally radial direction. Furthermore, the crystal 72 should be ground so that its natural frequency in this mode coincides with the natural frequency of the cavity 79 as an acoustic resonator. This is made possible by the fact that the natural frequency of the crystal depends primarily upon the dimensions of the two radii and only to a small degree upon the axial dimension of the crystal; whereas the acoustic frequency of the cavity 79 is determined primarily by the depth of the cavity and only slightly by its radial dimension. By cutting the toroid first to its required radial dimension and then grinding the crystal down to its appropriate axial dimension, it is possible to get these two mechanical oscillations, that within the cavity and that radial within the crystal, to agree in frequency. This permits the oscillatory energy to be taken off as a piezoelectric effect through the annular electrodes 75 and 76. The reflecting crystal 74 which terminates the cavity 79 acoustically is also made to correspond in natural frequency with that of the resonant cavity; and since the face of crystal 74 forms the base of the cavity this crystal is driven in longitudinal vibration, and the resulting electromotive force generated thereby is derived through the electrodes 77 and 78 and added to that supplied from the toroid. In this manner there is provided a supersonic resonant chamber all the walls of which take up the oscillatory energy and convert it into electric power. This power is supplied to the load through the transformer 80. The toroid 72 need be held in place in a radial sense only loosely by the cylinder 73 since it will tend to be automatically centered by the air jet impinging on the cavity 79.

In Fig. 9 a base 83 supports a massive reaction pedestal 84 of iron or steel which may be of generally cylindrical contour and may be threaded as at 85 to engage and hold in position the surrounding cylinder 86. The cylinder is closed at its upper end by a cap 87 through which projects the vertical fluid jet nozzle 88. A screw threaded adjusting member 89 enables the position of the tip of nozzle 88 to be accurately set. An open-ended Helmholtz resonator 90 is placed with its upper open end adjacent a region of instability of the jet and is held in position by an annular grill 91 attached to the exterior wall of the resonator and to the interior wall of cylinder 86. Grill 91 has an inturned flange 92 which serves as a seat for a toroidal piezoelectric element 93 and the flange together with cylinder 86 maintain the toroidal element approximately in its correct position, at a point just outside the mouth of the Helmholtz resonator where there are generated the high compression waves resulting from reaction of the pressure of the incident jet with the reflected pressures from the Helmholtz resonator. At this point in the system the supersonic waves radiate outward and tend to induce vigorous radial oscillations in the toroidal resonator. The fluid jet passing down through the toroid effectively holds the toroid centered. The toroid inner and outer diameters are made such that the natural period of oscillation of the crystal in a radial manner corresponds to the natural period of the Helmholtz cavity resonator. The inner diameter of the toroid is made large enough to permit the jet to flow through it without obstruction. Mounted on the pedestal 84 by cementing or otherwise is a longitudinally oscillating piezoelectric bar 94 having its upper plane end face very closely contiguous to the lower end of the Helmholtz resonator 90 so as effectively to serve as a closed reflecting end for the resonator. The toroidal crystal is provided with electrodes 95 and 96 on its upper and lower faces respectively, these electrodes being connected to the external output circuit through the transformer 97. In like manner the piezoelectric bar 94 is provided with electrodes 98 and 99 on opposite faces and these electrodes are connected to the primary winding of the output transformer 100.

The supporting cylinder 86 is constructed of perforated sheet or screen-like material as indicated so as to permit free escape from its apertures 101 of the fluid from the jet. The apertures in the grill 91 likewise permit the fluid to pass freely from the region of the Helmholtz resonator. The fluid may be compressed air or compressed gas or other equivalent substance. The longitudinal piezoelectric bar 94 is given an effective length measured in the direction of the axis of cylinder 86 equal to a quarter wavelength at the operating frequency of the Helmholtz resonator 90, and the pedestal 84 is given an effective length measured in the direction of the cylinder axis equal to a half wavelength at the same frequency, so that their junction plane is a nodal point and oscillatory energy is reflected back to the piezoelectric bar.

In operation after adjustment of the nozzle position and the pressure on the jet the jet of compressed air or other fluid of the order of pressure of 2 or 3 atmospheres emanating from the nozzle 88 sets up at its point of instability at the mouth of the Helmholtz resonator 90 forces tending to cause compressions and rarefactions in the resonator in accordance with the principle of the Hartmann oscillator. In this manner the resonator 90 is set in mechanical oscillation at its natural frequency as are also the toroidal piezoelectric element 93 which vibrates in a radial direction and the longitudinal bar 94 which vibrates in a longitudinal direction. The Helmholtz resonator resonates by virtue of reflections from its walls and from the end face of the longitudinal piezoelectric bar 94. Normally the end surface of the cavity is a point of reflection of high relative impedance in the cavity resonator which is an intrinsically low impedance device. The end face of the crystal bar is a plane of relatively low impedance with respect to the longitudinal oscillation of the piezoelectric bar which is an intrinsically high impedance device so that there is a matching of high acoustic impedances at this point and the piezoelectric bar is set into vigorous longitudinal vibration and a corresponding piezoelectric electromotive force is derived therefrom. As a result of the mechanical vibrations of the two piezoelectric elements so designed as to have a natural oscillation at the frequency of the Helmholtz resonator, these two piezoelectric elements will supply corresponding frequency alternating electromotive forces to their respective output circuits which may be utilized as separate current supply systems or may be connected in series or in parallel to supply a single load, as desired.

It will be understood that in the systems of Fig. 3 to Fig. 9, inclusive the apparatus for supplying compressed gas may correspond to the elements 24, 25, 26 and 29 of Fig. 1. In like manner the electrical load may be of the type disclosed in Fig. 1, the transformers 50, 70, 80, 97 and 100, respectively having secondary output connections corresponding with those of transformer 12 of Fig. 1. Although a single secondary winding only has been shown for each of these transformers, it will be understood that there may be a plurality of such secondary windings, as in the case of the secondary windings of transformer 12 of Fig. 1.

Thus is there obtained a simple and rugged converter of the power carried by a fluid under high pressure into electric oscillations of high frequency and at relatively high voltage and small current. This construction, therefore, provides a generator of high internal impedance. This is advantageous for the use of the device as a source of power for the anode circuit of vacuum tube devices a circuit which itself is generally of high impedance.

What is claimed is:

1. A piezoelectric element having charge accumulating plates, a rectifier having input terminals connected to said plates said rectifier being adapted to supply a unidirectional electromotive force to a load and percussion means for separately exciting the piezoelectric element at its resonant frequency to cause it to produce an alternating charge upon said plates.

2. In combination an internal combustion motor, a gaseous compressor driven thereby, a high frequency sound source actuated by compressed gas from said compressor, a piezoelectric element positioned adjacent the sound source to be mechanically excited thereby and means for withdrawing an alternating electro-motive force from said piezoelectric element.

3. In combination, a source of ultra audible sound, a piezoelectric element provided with conducting armatures on opposite surfaces and positioned adjacent said sound source to cause the element to be set into corresponding mechanical vibrations and a rectifier having input terminals connected to said armatures and output terminals to which a unidirectional current load may be connected.

4. In combination, a sound wave source, a piezoelectric element provided with conducting armatures on opposite surfaces and positioned adjacent said source to cause the element to be sent into corresponding mechanical vibrations, and a rectifier having input terminals connected to said armatures and output terminals to which a unidirection current load may be connected.

5. The method of producing an electromotive force suitable for energization of high impedance electric discharge devices which comprises initially generating mechanical power, producing supersonic energy therefrom and converting the supersonic energy to corresponding frequency piezoelectric energy.

6. An electric power source comprising a transducer for converting mechanical energy to electrical energy, said transducer having a supersonic natural frequency, a source of mechanical power having a natural frequency equal to said supersonic natural frequency for driving the transducer at its natural frequency and means for deriving from the transducer electric power of the supersonic frequency.

7. In combination, a piezoelectric element provided with a pair of spaced conducting armatures on which piezoelectric charges are excited upon application of mechanical stresses to the piezoelectric element, said element having a natural vibration frequency well above the audible range, means for applying to said element an alternating mechanical stress of the natural frequency of said element and a pair of output terminals connected respectively to said armatures to enable withdrawal of alternating electric current by a load connected to said terminals.

8. A power supply device comprising a fluid-flow type of mechanical oscillation generator driving a mechanical electrical oscillation generator.

9. A power supply device comprising a gas-flow type of mechanical wave generator operating at a particular supersonic frequency driving a piezoelectric crystal generator of the same high frequency.

10. A mechanical oscillator having a natural frequency above audibility, means for continuously, separately, and mechanically exciting said oscillator to cause it to execute oscillations at its natural frequency and a mechanical electrical transducer connected to the oscillator to receive mechanical oscillations therefrom and to convert the received energy into electrical energy, said transducer having electrical output terminals between which there is a high internal impedance.

11. A power supply system comprising a mechanical whistle having a natural frequency above audibility and a mechanical to electrical energy transducer mechanically connected to the whistle to enable production of electrical energy.

12. A power supply system comprising a mechanical whistle having a natural frequency above audibility, a mechanical to electrical energy transducer mechanically connected to the whistle to enable production of electrical energy and means for subjecting said whistle to the impact of a continuous fluid jet to excite the whistle at its natural frequency.

13. A source of continuous fluid jet, a mechanical oscillator having a natural oscillation frequency above audibility connected to said source to be impelled by said jet so as to set up superaudible mechanical oscillations and a direct mechanical to electrical energy transducer connected to said mechanical oscillator to produce electrical output energy.

14. In a prime source of electrical energy, a fluid jet nozzle, an open-ended sound resonator, a longitudinal piezoelectric resonator and a frame supporting each of said elements in alignment with the open-ended resonator at a region of instability of the jet and the longitudinal resonator having an end face so closely adjacent one end of the open-ended resonator as effectively to constitute a Helmholtz resonator.

15. In a prime source of electrical energy, a fluid jet nozzle, a toroidal piezoelectric resonator having a central opening in line with the jet, an open-ended sound resonator, means having a reflecting surface, a frame supporting said nozzle, said toroidal resonator, said sound resonator and said reflecting surface means in alignment so that the open-ended resonator is at a region of instability of the jet and the reflecting surface is so closely adjacent one end of the open-ended resonator as effectively to constitute therewith a Helmholtz resonator and means for deriving an output electromotive force from the toroidal piezoelectric resonator.

16. In a prime source of electrical energy, a fluid jet nozzle, a toroidal piezoelectric resonator having a central opening in line with the jet, an open-ended sound resonator, a longitudinally vibrating piezoelectric resonator, a frame supporting said nozzle, toroidal resonator, open-ended resonator and longitudinally vibrating resonator in alignment and with the open end of the open-ended resonator in a region of instability of the jet and one end of the longitudinally vibrating resonator so closely adjacent the other end of the open-ended resonator as to effectively constitute therewith a Helmholtz resonator and means for deriving an output electromotive force from each of the piezoelectric resonators.

17. A Helmholtz resonator open at one end, means for exciting the resonator to cause it to execute mechanical oscillations of its natural frequency and a piezoelectric element mounted in proximity to the other end of the Helmholtz resonator so as effectively to constitute a reflecting end closure therefor, the piezoelectric element being mounted to execute oscillations in the same direction as the resonator whereby the high acoustic impedance of the piezoelectric element matches that of the contiguous resonator.

18. A Helmholtz resonator, means for impressing a fluid jet thereon to excite the resonator and a toroidal piezoelectric element surrounding the jet adjacent an opening of the resonator on which the jet impinges whereby the element is subjected to radial forces resulting from the fluid interactions at the opening of the resonator.

19. A system for generating electrical power comprising a battery of superaudible whistles, a common means for exciting the whistles, a plurality of piezoelectric elements mechanically connected one to each whistle to be set in oscillation thereby, means for deriving electromotive forces from said oscillating piezoelectric elements and for connecting the sources of electromotive force in parallel.

20. A system for generating electrical power comprising a piezoelectric element mounted for longitudinal vibration at a natural frequency of the element and a Helmholtz oscillator mechanically connected to said element at each end whereby when said oscillators are simultaneously set in oscillation at the natural frequency of the piezoelectric element they serve to cooperate in exciting therein mechanical oscillations to give rise to corresponding frequency electromotive forces.

21. A generator of electrical oscillations in the supra-audible frequency range which comprises an elastic vibratory element capable of vibrating at a natural frequency determined by its dimensions, an acoustic cavity resonator tuned to the natural frequency of the element and closely coupled thereto, means for sustaining air chamber oscillations in said resonator, and means for deriving electrical energy from the vibrations of said element.

22. A generator of oscillations in the supra-audible frequency range which comprises an elastic vibratory element of intrinsically high impedance and capable of executing vibrations about a relatively high impedance nodal point, so that a portion of said element removed from said nodal point undergoes relatively large movement and exhibits a relatively low impedance, means supporting said element at said nodal point, an acoustic resonator of intrinsically low impedance and having portions exhibiting relatively high impedance and other portions exhibiting relatively low impedance, a high impedance portion of said resonator being tightly coupled to said removed low impedance portion of said element.

23. A piezoelectric crystal formed to execute axial longitudinal natural frequency vibrations about a nodal plane, a free end of said crystal being provided with a recess of dimensions such that the walls of said recess constitute an acoustic resonator tuned to the frequency of said element, and means for setting up standing acoustic pressure waves in said recess.

LLOYD ESPENSCHIED.

REFERENCES CITED

The following references are of record in the file of this patent:

UNITED STATES PATENTS

| Number | Name | Date |
|---|---|---|
| 1,583,621 | Steinberg | May 4, 1926 |
| 1,697,897 | Apple | Jan. 3, 1929 |
| 1,752,224 | Apple | Mar. 25, 1930 |
| 1,806,871 | Bower | May 26, 1931 |
| 1,807,010 | Ranger | May 26, 1931 |
| 1,807,292 | Joffe | May 26, 1931 |
| 1,829,234 | Nicolson | Oct. 27, 1931 |
| 1,927,141 | Thomas | Sept. 19, 1933 |
| 1,955,471 | Pooler | Apr. 17, 1934 |
| 1,975,517 | Nicolson | Oct. 2, 1934 |
| 1,992,003 | Cook | Feb. 19, 1935 |
| 2,001,532 | Hintze | May 14, 1935 |
| 2,004,168 | Marks | June 11, 1935 |
| 2,024,531 | Lyons | Dec. 17, 1935 |
| 2,047,531 | Von Ardenne | July 14, 1936 |
| 2,248,574 | Knight | July 8, 1941 |
| 2,250,496 | Postlewaite | July 29, 1941 |
| 2,276,832 | Dome | Mar. 17, 1942 |
| 2,299,260 | Sivian | Oct. 20, 1942 |
| 2,309,703 | Lovell | Feb. 2, 1943 |

FOREIGN PATENTS

| Number | Country | Date |
|---|---|---|
| 192,725 | Great Britain | Feb. 1, 1923 |
| 513,971 | Great Britain | Oct. 26, 1939 |